Figure 1:
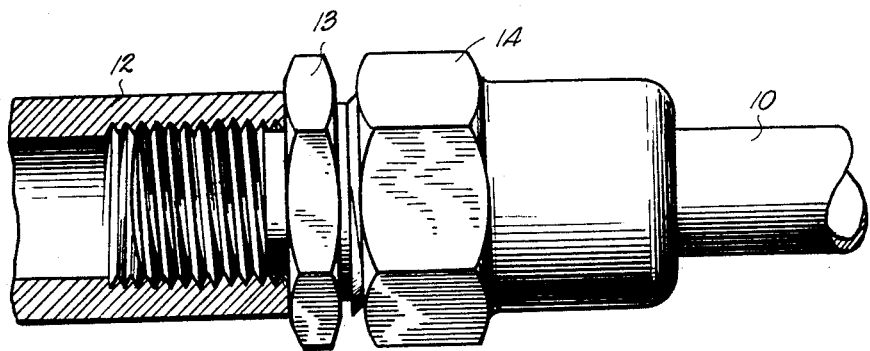

July 1, 1947. J. F. STEPHENS 2,423,122
TUBE FITTING
Filed April 19, 1945

INVENTORS.
Joseph F. Stephens
BY
ATTORNEY.

Patented July 1, 1947

2,423,122

UNITED STATES PATENT OFFICE 2,423,122

TUBE FITTING

Joseph F. Stephens, Kansas City, Mo., assignor to Gustin-Bacon Manufacturing Company, a corporation of Missouri Application April 19, 1945, Serial No. 589,151

1 Claim. (Cl. 285—90)

This invention relates to improvements in tubing and pipe fittings and refers more particularly to an improved type of vibration resistant coupling for making a joint between plain end pipes or tubes, or between a plain end pipe or tube and other elements of a fluid system.

The salient novelty over what has preceded lies in the bonding or cementing of a flexible distortable ring such as a rubber ring to the outer surface of a plain end tube or pipe where the joint is to be made and the application of the fitting members at the bonded ring. This bonding of the ring to the tubing is effected by recently developed methods which produce a strong and vibration resistant welded connection, such as the "Cycleweld" process developed by the Chrysler Corporation or the "Pliobond" process developed by the Goodyear Tire and Rubber Company. The ring is positioned adjacent the end of the tubing where the joint is to be made and embracing the ring are parts which when tightened together form a seal on the exterior surface of the ring and serve to prevent the tube end from being pulled from the fitting.

While it is believed that the principal use of the fittings are on thin wall tubes, they may be used as well on connections for pipe, metallic or non-metallic, in sizes and wall thicknesses considerably greater than that normally encountered in tubing.

Thin wall tubes of metal, plastic, and glass, are commonly used for fluid systems in aircraft, trucks, trains, machine tools and many other machines. This is not readily threaded or welded and special types of fittings are required for its connections. Such fittings may be generally divided into three classes:

1. Soldered couplings.
2. Couplings which require preparation of the tube ends such as flaring, beating, or swedging on of a ferrule or metal ring.
3. Couplings which employ a gripping element tightened onto the tube by means of a compression nut.

In all but the first classification the wall structure of the tube where the joint is made is altered or deformed. The present invention eliminates the necessity for deforming the tube and relies upon the bond between the flexible ring and the tube surface for its strength, and upon this bond as well as the compression of the flexible ring against the external parts for its seal.

The joint made by flaring the end of a tube is made by fixing the flared portion of the tube between conical shaped faces of the nut and nipple, the conical faces being complementary to the flare of the tube. Compression of the flared portion of the tubing between the conical faces is such as to effect a metal-to-metal seal against pressure. The operation of flaring the tube is time-consuming. If hydraulic fluid is to be sealed the flares must be carefully made and care exercised not to scratch or injure the tubing in the flaring operation. Likewise, the conical faces or seats of the nuts and nipples must be smooth and accurately made as to dimension and the lead of the tubing into the fittings must be carefully adjusted to prevent canting of the flare between the conical surfaces of the fittings. The operation of flaring the tube expands, thins and stresses the tube wall making it particularly vulnerable to fatigue failure especially at the base of the flare.

Other types of fittings for tube joints employ rubber or synthetic rubber rings compressed against the tubing by screwing together fitting members to form a pressure-tight seal. In such joints the flexible distortable substance effects a more dependable seal particularly where surface imperfections or scratches are present on the tubing which produce leaks in metal-to-metal seals of the flared type. These flexible rings have the additional function of cushioning that portion of the tubing which enters the fitting from the effects of vibration and fatigue, the most prevalent cause of failure at the joint or coupling. If the ends of the tubing are not flared and the system is under high pressure some other means of seizing or gripping the tubing at the joint with sufficient force to prevent it from being blown from the fitting must be employed. The seizure of a rubber sealing element under compression even when accomplished by its indenture into the face of the tubing is not alone sufficient. In some fittings a metal ferrule is indented into the face of the tubing, a peripheral rib of the ferrule seating circumferentially into the rubber sealing ring thus anchoring the sealing ring to the tubing. Other fittings utilize a metal split gripping ring with annular teeth that engage the tubing, as shown in a copending application, Serial 530,174 filed April 8, 1944. The internal gripping members within the ring are seated into the periphery of the tubing by pressure of the rubber ring when it is compressed between the nut and nipple portions of the fitting.

Any means of fixing the tubing with a metal element, such as a ferrule or gripping ring, tends to localize flexing stresses in the tubing at the areas of contact between the metal elements and the tubing. Vibration tests definitely show that it is at these areas that failure of the joint usually occurs.

An object, therefore, of the present invention is to provide a fitting which will assure a pressure-tight joint and afford improved performance under flexing or vibration conditions over conventional fittings.

Another object is to avoid alteration or distortion of the tube structure in the fitting, thus eliminating the localization of flexing stresses.

A further object is to provide a flexible distortable ring easily applied and bonded to the tubing eliminating the necessity of separate forming tools or tools for the application of metal tube to gripping elements.

Other and further objects of the invention will appear from the following description.

Figure 2:
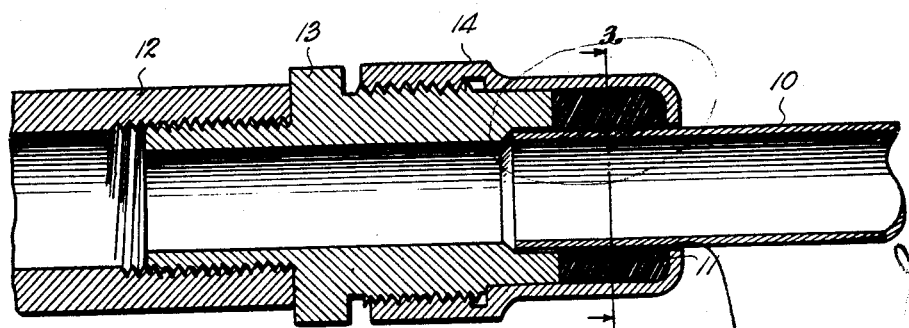
Figure 3:
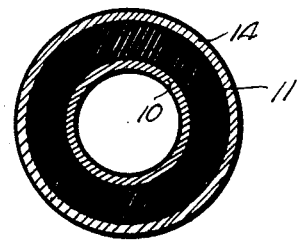

In the accompanying drawings which are a part of the instant specification and are to be read in conjunction therewith in which like reference numerals are used to indicate like parts in the various views, Fig. 1 is a side view of a coupling which embodies the invention with parts in section, Fig. 2 is a central section of the fitting shown in Fig. 1, and Fig. 3 is a view taken along the line 3—3 in Fig. 2 in the direction of the arrows.

Referring to the drawings, at 10 is shown the end of a length of plain end tubing. Surrounding the tubing and near its end is a flexible distortable ring 11, preferably of rubber or synthetic rubber. This ring is fixedly bonded to the metal periphery of the tube 10 by methods such as the Cycleweld or Pliobond processes.

One end of the nipple 13 is threaded with a taper pipe thread for connection with some part of a fluid system while the other end is threaded to receive the nut 14. The ring 11 is bonded to the tubing before the final assembly of the parts and it is necessary to slip the nut over the tubing before the bond is made. The fitting is assembled by inserting the end of the tubing into the counter bore of the nipple, and then tightening the nut which forms a fluid seal on the outer surface of the ring. The fitting, of course, may be disassembled and reassembled at any time in the same manner.

The type of fitting shown on the drawing is merely one embodiment, as a T, an elbow, or a union type fitting may be substituted using this same novel principle of the joint. The invention resides in the manner in which the tube end is joined to the fitting and is essentially a means of retention of the tubing and the formation of a fluid-tight seal.

In bonding the ring to the tubing it is preferable to vulcanize the ring at the tubing surface and heat as well as pressure is then required. This pressure may be applied by clamps which would surround the rubber ring on its sides and outer periphery or the nut and nipple portions of the fitting itself may be used to exert the necessary pressure on the ring during vulcanization or bonding. The heat for vulcanization can be applied by inserting a heating element into the end of the tubing to a position where the heat is localized to approximately that portion of the tubing surrounded by the rubber ring. The heat to cement the layer between the ring and tubing would thus be passed through the wall of the tubing. Another suggested method for applying heat would be to use live steam externally or internally. A third method is to employ electrical induction heating, in which case the pressurizing means is preferably non-metallic to heat only the tubing and by transmission of heat through the tubing to the adjacent adhesive.

It is also contemplated to inset within the inner surface of the flexible rubber ring or upon the inner surface of the ring a resistance element in the form of a coil or zigzag wire, the leads of which would be brought from the sides of the ring and extended through the ends of the fitting when the fittings were used to apply the pressure. Connections to a source of electrical energy could then be made to the resistance coil within the ring and the heat of vulcanization supplied from this source. In other words, the coil or resistance element electrically heated would provide the heat necessary for vulcanization of the cement or bonding layer in which it would be embedded. In such application it would be necessary only to insert the tubing member into the fitting which has been assembled with a rubber ring and resistance element in place. The nut of the fitting would then be tightened to the pressure required for vulcanization of the bonding layer and the leads from the resistance element connected with an available electrical circuit. When the vulcanization is complete the wire leads are clipped flush with the surface of the fitting and the compression nut of the fitting adjusted to the degree required to maintain a pressure-tight seal.

By such methods of uniting the rubber sealing ring to the tubing, the ring is firmly anchored against axial movement up to the shear strength of the rubber ring itself. This is comparable with the strength of other conventional couplings or joints where metal rings are used to anchor the rubber against axial movement. In the instant method, however, no indenture or deformation of the tubing structure is required and localization of areas of stress which produce fatigue, crystallization, or failures in the tubing have been entirely avoided. Also, after bonding of the rubber ring to the tubing by the instant method the hydraulic fluid cannot pass between the ring and tubing and it is only necessary that the nut and nipple portions exert sufficient compressive force against the rubber ring to effect a fluid seal within the chamber formed by the portions of the fitting. Therefore, the joint is more flexible since the rubber is not in a high state of compression while on other types of fittings, utilizing both rubber and metal gripping elements, the rubber must be compressed to a high degree in order to indent itself into the tubing or in order to cause the metal gripping element to seize the tubing. Furthermore, the rubber or flexible ring in such high state of compression is considerably less yielding and, consequently, its functioning in flexing of the joint or as a cushion against vibration is materially impaired.

To establish the efficacy of the fitting over conventional and competitive types, exhaustive tests were conducted to determine the advantages and disadvantages of the different designs. The conditions of the tests to which all of the fittings were subjected were the same. Among the types tested were fittings employing the flared end tubing and couplings made with plain end tubing using metallic gripping elements and distortion or marring of the tube wall to hold the gripping elements in place. At the same time tests were made upon tubing employing the instant invention where the flexible ring was bonded by the processes described adjacent the tube end. The tests were of two types. First, the end pull test to measure the strength of attachment of the fitting to the tubing and, second, vibration tests under pressure.

All tests were made with one-half inch fittings suitable for one-half inch O. D. tubing. Aluminum tubing, such as is used in the aircraft industry, and steel tubing were employed in the tests. Included in the tests were virtually all of the conventional types of tube fittings, both flared and plain end, and the life tests of these fittings range between a minimum of 15 minutes and a maximum of 500 hours. The tensile strength of the one-half inch aluminum tubing, 0.42 inch wall gauge, used largely in these tests is from 1700 pounds to 1800 pounds per square inch. The hydrostatic burst is approximately 5200 pounds per square inch which is equivalent to an end pull or tension stress of approximately 700 pounds. The tubing will burst before the holding strength of nearly all types of fittings is taxed to failure. Certain types of flared end fittings developed a joint strength approximately the strength of the tubing, yet the fittings which tested highest in tensile strength were very quick to fail on the vibration tester, some lasting only 1¼ to 3½ hours.

The vibration tester was patterned after a conventional machine now in use in the aircraft industry. The fittings to be tested were subjected to a vibration of 5/64 inch amplitude and a frequency of 3600 C. P. M. while maintaining within the tube and fitting hydraulic pressure of 2,000 pounds per square inch. Tests were continued until a leak developed or there was a failure in the fitting or tubing. These vibration tests were accelerated over service conditions, chiefly by using an amplitude considerably greater than that normally encountered.

Recently published data of the aircraft industry is to the effect that if an instrument or device withstands in tests 3600 C. P. M. through an amplitude of 1/32 inch for a period of ten hours it would be unlikely to give difficulty in service over the life of the plane. The results of these tests upon aluminum tubing showed that the flared end tubing is more likely to fail by means of a fatigue crack at the base of the flare, while in the case of plain end fittings, where metallic gripping members are used or a ferrule or ring is attached onto the tube distorting the tube wall, a fatigue crack usually develops circumferentially under the teeth or along the edge portions of the metal gripping element. In the case of steel tubing, failures occurred with very short life in all types of flared end fittings because of the difficulty in forming the flares without greatly weakening the metal, which has less ductility than copper or soft temper aluminum. In some tests with plain end fittings where no circumferential cracks developed, the fitting failed by the tubing drawing through the metallic gripping elements, and in other tests with fittings employing rubber seals leaks occurred as a result of the rubber cold flowing or extruding from the fitting and relaxing its pressure seal on the tubing.

When testing the vulcanized type of fitting without distortion of the tube wall no tests have shown a single failure within the fitting. All failures thus far experienced have been at points removed from the fitting. It seems reasonable to conclude that in this new type of fitting there is realized a flexing life at the point of connection which is equal to that of the aluminum or steel tubing itself. The apparent reason for this is the fact that the mechanical connection to the tubing is not localized at any one point, but is distributed over the length of the flexible ring.

With respect to tensile tests made by pulling the fitting off of the tubing on which it is mounted the vulcanized bond between the gasket or flexible ring and the tubing was such as to yield a tensile strength of 1400 to 1700 pounds, the latter being approximately that of the strength of the aluminum tubing. While only certain of the flared end type fittings approach this tensile strength the life in flexing of the flared end fittings which depend upon a metal-to-metal seal is very much shorter than is the life of the fittings of the instant invention. These tensile or end pull tests are in excess of the end pull which would result from bursting the aluminum tubing hydrostatically so an end pull of 800 pounds insures that the fitting will remain in place when the tubing is subjected to a hydrostatic pressure sufficient to burst it.

The fact that during none of the tests where the vulcanized gasket has been used has there been a failure of the joint at the fitting clearly points to the manifest superiority of this type fitting.

From the foregoing it will be seen that this invention is one well adapted to attain all of the ends and objects hereinabove set forth together with other advantages which are obvious and which are inherent to the fitting structure.

It will be understood that certain features and subcombinations are of utility and may be employed without reference to other features and subcombinations. This is contemplated by and is within the scope of the claim.

As many possible embodiments may be made of the invention without departing from the scope thereof it is to be understood that all matter herein set forth or shown in the accompanying drawings is to be interpreted as illustrative and not in a limiting sense.

Having thus described my invention, I claim:

A flexible joint for plain end tubes including a tube end at which the joint is to be made, a connecting and sealing ring of resilient material fixedly bonded to the periphery of the tube adjacent its end without distortion of the tube wall, said bond providing means for distributing vibrational stresses throughout the length of the ring, interengaging elements adapted to be assembled upon the tube end, surrounding and compressing the flexible ring to form a pressure-tight joint.

JOSEPH F. STEPHENS.

REFERENCES CITED

The following references are of record in the file of this patent:

UNITED STATES PATENTS

| Number | Name | Date |
| --- | --- | --- |
| 740,640 | Gilbert | Oct. 6, 1903 |
| 2,048,256 | Geyer | July 21, 1936 |
| 1,339,736 | Burke | May 11, 1920 |